United States Patent
Sonoda et al.

(10) Patent No.: US 7,019,256 B2
(45) Date of Patent: Mar. 28, 2006

(54) METHOD AND APPARATUS FOR COMPOSITE YAG LASER/ARC WELDING

(75) Inventors: Hirofumi Sonoda, Narashino (JP); Kenji Okuyama, Narashino (JP); Junichi Ibukuro, Narashino (JP); Takanori Yahaba, Wako (JP); Masato Takikawa, Wako (JP); Yasutomo Ichiyama, Tokyo (JP); Toshiyasu Ukena, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 27 days.

(21) Appl. No.: 10/318,032

(22) Filed: Dec. 13, 2002

(65) Prior Publication Data

US 2003/0136768 A1    Jul. 24, 2003

(30) Foreign Application Priority Data

Dec. 27, 2001   (JP)   .............................. 2001-397947

(51) Int. Cl.
  B23K 26/12   (2006.01)
  B23K 9/16   (2006.01)
(52) U.S. Cl. .................................... 219/121.63; 219/75
(58) Field of Classification Search ........... 219/121.63, 219/121.64, 75
  See application file for complete search history.

(56) References Cited

U.S. PATENT DOCUMENTS

| | | | | |
|---|---|---|---|---|
| 4,390,774 A | * | 6/1983 | Steen et al. | 219/121.84 |
| 4,507,540 A | * | 3/1985 | Hamasaki | 219/121.64 |
| 5,821,493 A | * | 10/1998 | Beyer et al. | 219/121.46 |
| 5,866,870 A | * | 2/1999 | Walduck | 219/121.45 |
| 5,948,287 A | * | 9/1999 | Bandelin et al. | 219/121.64 |
| 6,034,343 A | * | 3/2000 | Hashimoto et al. | 219/74 |
| 6,191,379 B1 | * | 2/2001 | Offer et al. | 219/75 |
| 6,469,277 B1 | * | 10/2002 | Trube et al. | 219/137 R |

FOREIGN PATENT DOCUMENTS

| | | | |
|---|---|---|---|
| JP | 53-137044 | | 11/1978 |
| JP | 54-54932 | * | 5/1979 |
| JP | 56-49195 | | 11/1981 |
| JP | 60-106688 | * | 6/1985 |
| JP | 62-82194 | | 5/1987 |
| JP | 64-62291 | * | 3/1989 |
| JP | 4-51271 | | 8/1992 |
| JP | 5-69165 | * | 3/1993 |
| JP | 10-225782 | * | 8/1998 |
| JP | 2001-287060 | | 10/2001 |

* cited by examiner

Primary Examiner—Kevin P. Kerns
(74) Attorney, Agent, or Firm—Arent Fox PLLC

(57) ABSTRACT

A combined YAG laser/arc welding apparatus performs a welding operation with a large depth of fusion and a deep fusion at a high efficiency. The welding apparatus includes an arc electrode which targets a point on a welded member where a laser beam from a YAG laser is focused. While an arc power supply is connected between the arc electrode and the welded member, the welded member is irradiated by the YAG laser to produce plasmoid gasses and metal vapors or a plume which is effective to start an arc from the arc electrode. A combined YAG laser/arc welding operation takes place while keeping the plume within and without a keyhole. Welded surface is covered by a hood, and a shielded gas passed through a commutation metal network surrounds the welded focus to prevent an oxidation and keeps the plume maintained. A filler wire is fed to a molten pool.

4 Claims, 5 Drawing Sheets

METHOD AND APPARATUS FOR COMPOSITE YAG LASER/ARC WELDING

FIELD OF THE INVENTION

The present invention relates to the art of YAG laser welding in which the input welding heat is assisted by an electric arc, or a welding method utilizing a combination of YAG laser and an electric arc and an apparatus therefor.

BACKGROUND OF THE INVENTION

YAG laser welding has features as mentioned below and is extensively used in the automatic welding process for automobiles.

1) A focused laser radiation is obtained and enables a welding operation with a low distortion and at a high rate;

2) Laser radiation absorption coefficient for metal materials is several times higher than for a $CO_2$ laser, thus allowing an efficient welding operation. Since the wavelength of the laser radiation is on the order of 1/10 that of $CO_2$ laser, attenuation caused by plasmas generated during the welding operation is reduced.

3) The laser radiation can be transmitted through a flexible optical fiber, and thus a handling is facilitated and the laser can be used with a multi-joint robot. The transmission to a location which is located as far as 100 meters is possible.

4) The laser radiation can be used in a time division manner or spatially split (or power divided) manner, and this allows the distribution of the laser radiation to a plurality of machining stations to achieve a high utilization efficiency.

On the other hand, the welding operation by using YAG laser alone involves the following issues:

1) YAG laser is used in the welding operation by condensing the beam radiation to achieve an increased power density. However, the condensed spot has a very small diameter on the order of $\phi 0.3$ to $\phi 0.1$ mm, and this causes the following inconveniences;

For butt welding, the presence of a gap between members to be welded which are disposed in abutment against each other (see FIG. 4a, for example) allows the laser radiation to pass through the gap, causing weld defects. This imposes a severe demand on the cutting of an end face of a member to be welded where a weld is to be formed as well as on the manner of constraining parts of the members located adjacent to the weld.

For lap welding, the width of faying interface of a bead which extends from a top member to a bottom member (see FIG. 4b, for example) is limited, preventing a satisfactory bonding strength from being obtained.

For fillet welding, a satisfactory depth of fusion (see FIG. 4c. for example) cannot be obtained in the similar manner as mentioned above, preventing a satisfactory bonding strength from being obtained.

Where a filler wire is concurrently supplied to a region subject to YAG laser welding for purpose of improving excess weld metal or surface bead, the weldability is degraded because the power is consumed in melting the filler wire.

2) YAG laser apparatus requires a high equipment cost or initial cost, and therefore, where a plurality of equipment must be provided as in an automobile production line, a prohibitive installation cost results.

Japanese Utility Model Laid-Open No. 82,194/1987 discloses a nozzle structure which is used where it is considered that the presence of plasmoid gasses and metal vapors or a plume within and above a keyhole produced in a member being welded as a result of the irradiation from a laser stands in the way to achieving a deep fusion as a result of absorption of the laser beam by the plume, the nozzle structure serving to blow a shield gas into the keyhole to drive the plume to an exhaust path formed outside a laser radiation path to be withdrawn and exhausted. This represents an approach to improve the efficiency of supplying the input laser heat to the member being welded.

Japanese Patent Publications No. 49,195/1981 and No. 51,271/1992 and Japanese Patent Applications Laid-Open No. 137,044/1978 and No. 287,060/2001 disclose a combined use of TIG and a laser where a TIG torch melts a member to be welded, and a laser beam is projected to a resulting molten pool to increase the depth of fusion. These represent an approach in which TIG forms a shallow, but an extensive molten pool while the laser achieves a narrow, but deep fusion. The TIG produces an extensive molten pool to increase the width of the molten surface of the member being welded 41, 42 to fill a butt welding gap, as illustrated in FIG. 4a, for example, while the laser produces a deep fusion to increase the depth of fusion between members being welded 45, 46, as illustrated in FIG. 4c. As a consequence, the welding efficiency is improved as compared with the use of the laser alone, while improving the welding quality.

However, it will be seen that only the fusion produced by the laser prevails at a deep position, limiting the width of the fusion and resulting in a reduced welded strength. As illustrated in FIG. 4b, for example, the width of faying interface between members being welded 43, 44 is limited in the butt welding operation, leaving much to be improved.

SUMMARY OF THE INVENTION

It is an object of the invention to perform a welding operation with an increased width of fusion and an increased depth of fusion at a high efficiency.

The present invention relates to a composite YAG laser welding method in which an arc electrode is disposed close to a machining head of a YAG laser (or laser radiation condenser system) with a potential applied between the electrode and the member being welded so that the welding operation takes place thorough a combination of the YAG laser and the electric arc. According to the composite YAG laser welding method, the irradiation with the YAG laser radiation produce dissociated gasses and vapors of weld metal which are effective to excite and maintain an arc between the arc electrode and the member being welded and an atmosphere (plume) comprising plasmoid gasses and vapors of weld metal is maintained as close to a region which is irradiated by the laser by the combination of the YAG laser radiation and the arc.

Specifically, according to the composite YAG laser/arc welding method of the present invention, a spot on a member being welded which is irradiated by the YAG laser is targeted by the arc electrode, and while an arc power supply is connected across the arc electrode and the member being welded, the member being welded is irradiated by the YAG laser to produce plasmoid gasses and metal vapors which are effective to start an arc from the arc electrode, thus maintaining the plasmoid gasses and metal vapors which are produced by the YAG laser within and without the keyhole, thus completing the combined YAG laser/arc welding operation.

In a normal TIG process, a high frequency spark is created between the electrode and member to dissociate gasses in order to produce an arc. However, according to the present invention, there is no need to create such a high frequency spark. The plume, that is, the plasmoid gasses and metal vapors which are produced by the YAG laser and the arc assume an elevated temperature and a high pressure to depress a molten metal, and such heat transfer achieves a welding rate and a bead width which are greater than those achieved by the laser alone, thus allowing a greater depth of fusion.

This allows an increase in the gap margin in the butt welding operation, an increase in the width of faying interface in the lap welding operation, and an increase in the width of fusion in the fillet welding operation to be obtained, securing a bonding strength and providing a stable performance which is free from weld defects.

It will also be noted that when the invention is applied in the welding operation in which the filler wire is concurrently supplied, the heat input from the arc contributes to melting the filler wire, thus preventing the weldability from being degraded. It will be noted that the heat input from the arc generated allows a YAG laser of a low output to achieve a welding performance which is comparable to a YAG laser of a greater output. It is a simple matter to split a laser radiation from a single YAG laser source to a plurality of laser irradiation heads, thus allowing the installation cost per laser irradiation head to be simply reduced.

Above and other objects and features of the present invention will become apparent from the following description of several embodiments thereof with reference to the drawings.

BRIEF DESCRIPTION OF THE DRAWINGS

FIG. 3b is an enlarged section schematically illustrating a weld bead representing a result of composite YAG laser/arc welding operation which employed the welding apparatus shown in FIG. 3a;

DESCRIPTION OF PREFERRED EMBODIMENTS

First Embodiment

Figure 1:
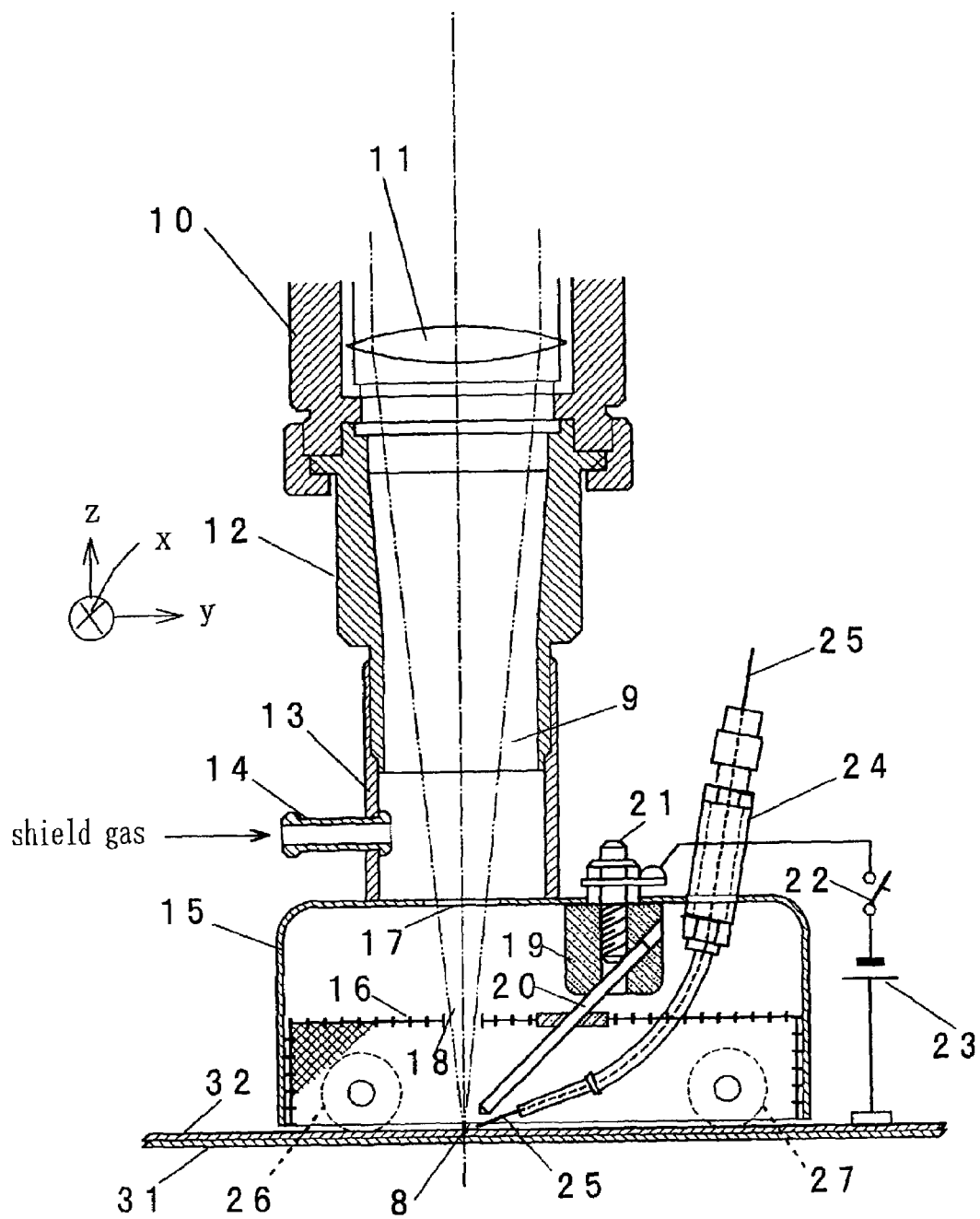
FIG. 1 is a longitudinal section of a welding head of a composite YAG laser/arc welding apparatus according to a first embodiment of the present invention.

FIG. 1 shows a composite YAG laser/arc welding apparatus according to one embodiment of the present invention. YAG laser beam 9 is supplied from a YAG laser source, not shown, through an optical fiber cable, not shown, to a YAG irradiation head 10. The head 10 includes a lens 11 through which the laser radiation is passed to converge to a focus 8 (a point being irradiated) through an objective sleeve 12 and a relay sleeve 13.

An objective hood 15 is secured to the bottom of the relay sleeve 13. A gas commutation metal network 16 is disposed within the hood 15 to divide the interior of the hood into an upper space or a gas supply space and a lower space or welding space. The hood 15 and the metal network 16 are formed with openings 17 and 18, respectively, which allow the laser radiation 9 to be directed toward the focus 8.

An electrode base 19 formed of ceramics is secured to the hood 15, and a tungsten electrode 20 is mounted on the electrode base 19 and is oriented to be directed toward the focus 8. The tungsten electrode 20 is secured to the electrode base 19 by a bolt 21 which presses against the electrode and which is connected through a power switch 22 to an arc welding power supply 23, the positive electrode of which is connected to a member 32 being welded.

A wire guide 24 extends through the hood 15 and the metal network 16 and is fixedly connected to the hood 15. A filler wire 25 is fed from a wire feeder, not shown, and is passed through the wire guide 24 and is brought by a wire feed tip located at the lower end of the wire guide 24 to the vicinity of the laser focus 8.

Wheels 26 and 27 are disposed in the bottom of the hood 15 to provide a small gap between the member 32 being welded and the bottom of the hood 15.

In FIG. 1, members 31 and 32 which are to be welded together comprises sheets, and when these sheets are subject to a lap welding operation, a shield gas is blown into the relay sleeve 13 through a pipe 14 which is mounted on the relay sleeve 13, the power switch 22 is closed to apply a no-load voltage across the electrode 20 and the sheet 31 which conditions for an arc starting, and then the irradiation of the YAG laser beam 9 is initiated. The plume which is produced by the irradiation causes an arc to be generated between the electrode 20 and the member 32. As soon as the arc is generated, the YAG irradiation head 10 begins to be driven in y direction and the filler wire 25 begins to be fed. This provides a stable welding condition. In other words, the laser irradiation welding and the arc welding run in parallel.

Under this welding condition, the shield gas which is blown into the relay sleeve 13 through the pipe 14 passes through the opening 17 to enter the gas supply chamber located above the commutation metal network 16 disposed within the hood 15 where it is diffused in both x and y directions to be commutated to be substantially vertical through the meshes of the commutation metal network 16 to descend on the surface of the member 32 being welded. After flowing along the surface, the shield gas passes through a gap provided at the bottom of the hood 15 to be exhausted to the outside of the hood. Such a flow of the shield gas allows the interior of the hood 15 to be filled with the shield gas, and accordingly, in the welding space disposed below the metal network 16, the shield gas provides a vertically commutated gentle flow which surrounds the focus 8, namely, the keyhole formed by the laser irradiation, the plume disposed within and without the keyhole, the arc and the tungsten electrode.

The surrounding gas isolates the molten pool around the focus 8 and the tungsten electrode 20 from air (oxygen) to prevent their oxidation and also prevent the plume located within and without the keyhole from being scattered, thus maintaining the plume within and without the keyhole.

Figure 2A:
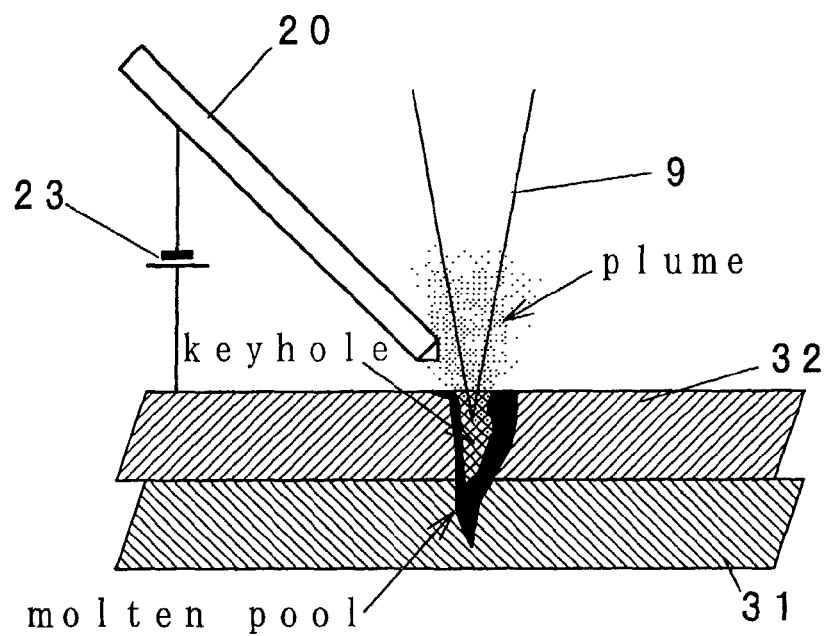
FIG. 2a is a schematic section, to an enlarged scale, around a focus 8 shown in FIG. 1.

FIG. 2a schematically shows a keyhole. As a result of the irradiation by the YAG laser, or as a result of the injection of a high density power, the plume within the keyhole assume a high temperature and a high pressure explosively to pressurize the molten metal within the keyhole, melting the bottom of the keyhole to provide a deep fusion. It is to be noted that if the shield gas stream (which strongly displaces or blows away) the plume is allowed to be directed to the focus 8, the fusion will be extremely inhibited, and accordingly, in order to achieve a deep fusion, it is essential that the plume be maintained as much as possible in the keyhole. This result has been confirmed by the inventor by an experiment.

Figure 2B:
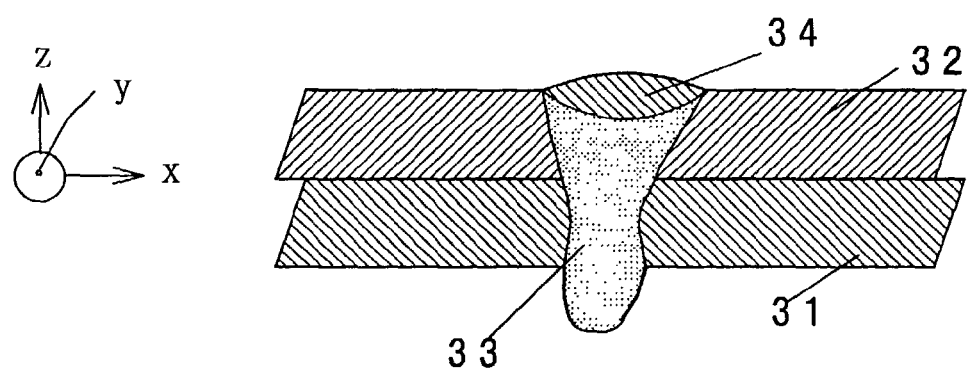
FIG. 2b is an enlarged section schematically showing a weld bead representing a result of composite YAG laser/arc welding operation which employed the welding apparatus shown in FIG. 1.

A lap welded bead as shown in FIG. 2*b* is obtained by the described welding operation. In this Figure, 33 represents a region of the member being welded which is once melted and is then solidified, and 34 represents a bead which is formed by the filler wire 25. It will be noted that the width of the faying interface is large and the fusion is deep. In this manner, a high rate welding operation of a stabilized quality is possible. The welding conditions used are given below.

Figure 3A:
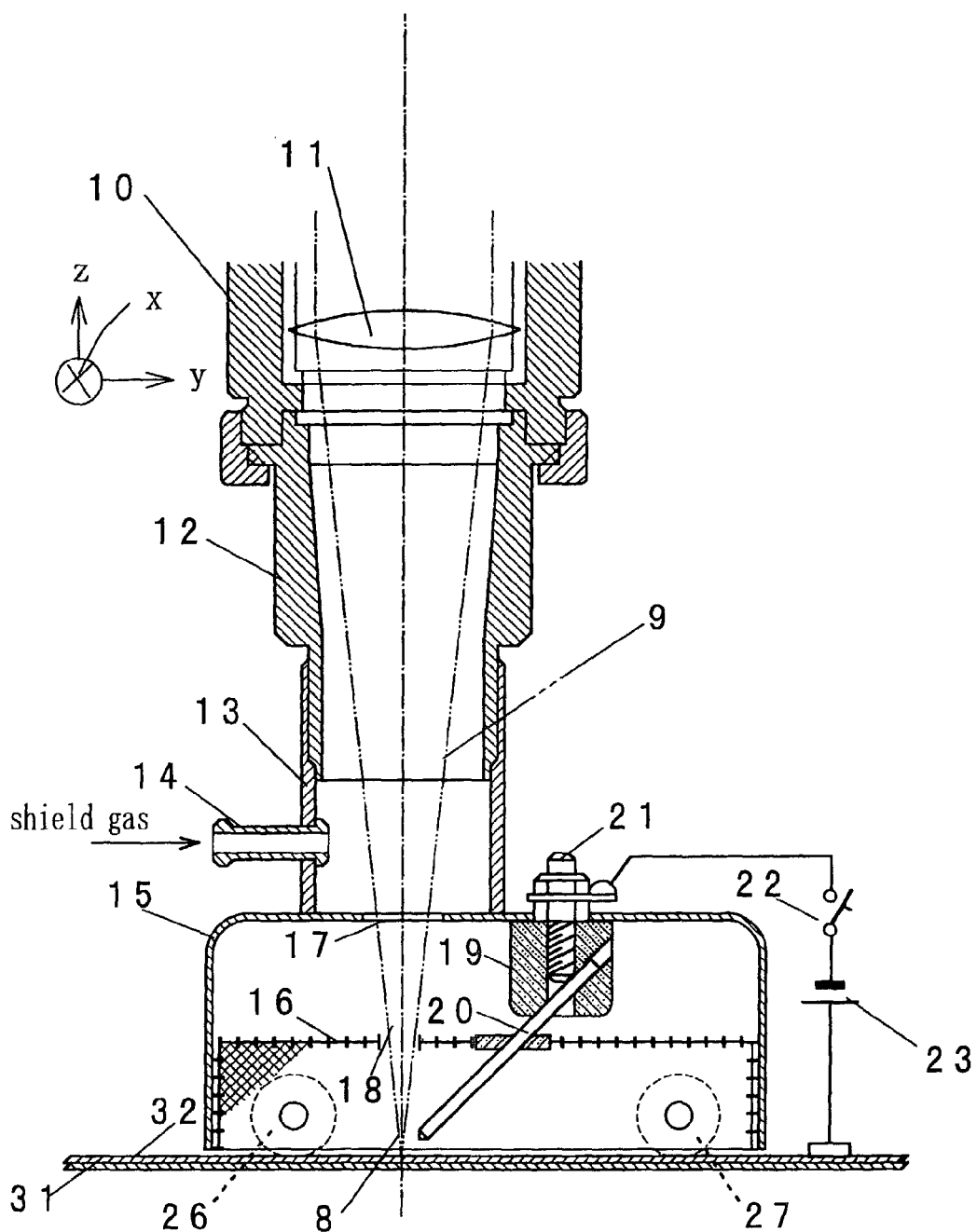
FIG. 3a is a longitudinal section of a welding head of a composite YAG laser/arc welding apparatus according to a second embodiment of the present invention.
Figure 3B:
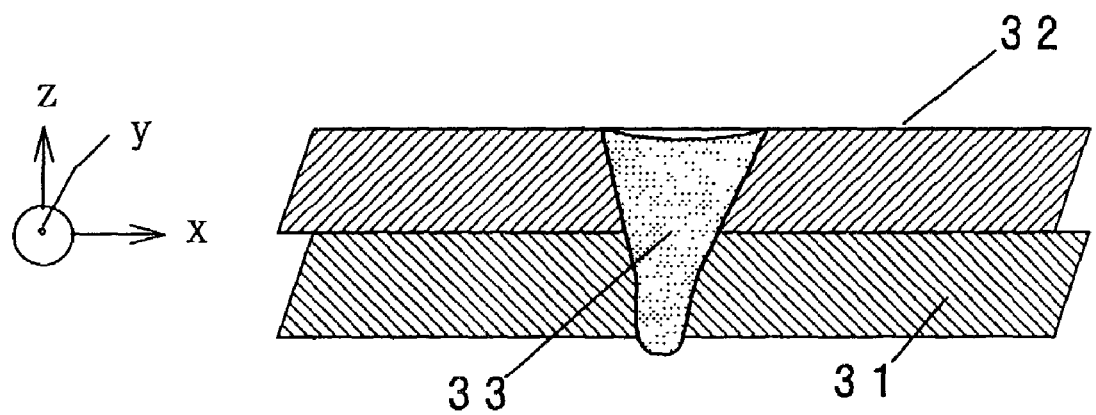
Figure 4A:
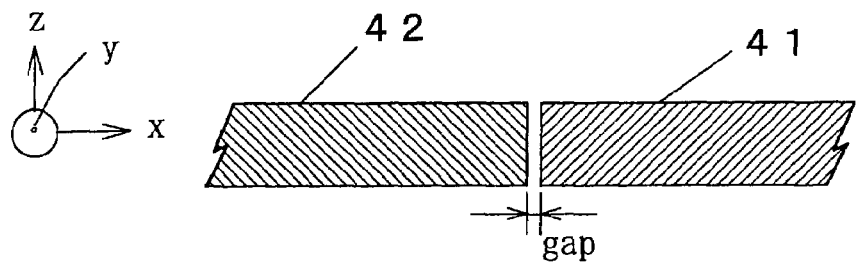
FIG. 4a is an enlarged section illustrating a butt welding gap formed between members 41, 42 which are subject to a butt welding operation.
Figure 4B:
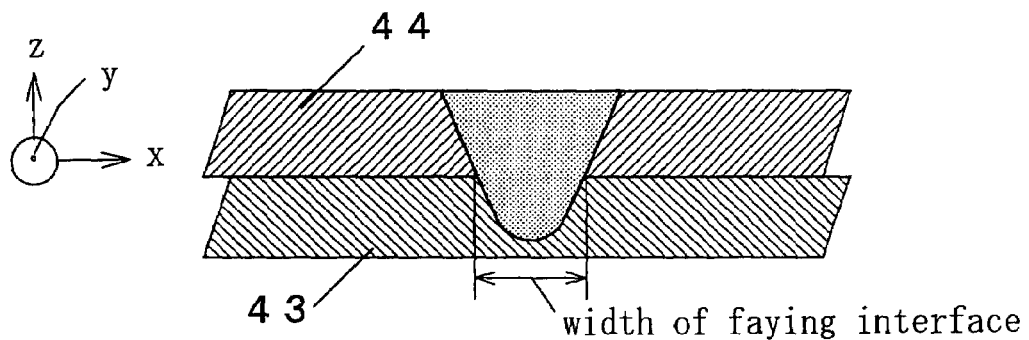
FIG. 4b is an enlarged section illustrating the width of a faying interface formed between members 43 and 44 in a lap welding operation.
Figure 4C:
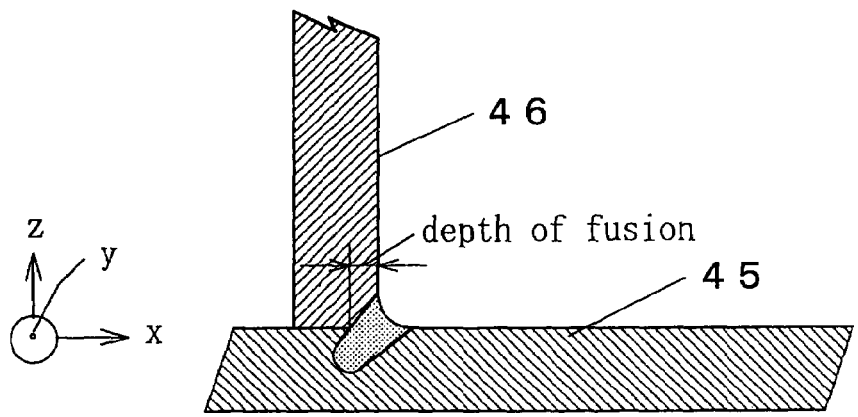
FIG. 4c is an enlarged section illustrating the width of fusion formed between members 45 and 46 in a fillet welding operation.

Welded member 31: material A5052, 2 mm thick
Welded member 32: material A5052, 2 mm thick
YAG laser: output of 4 KW, without assist gas (or center gas)
Arc
   Current: 200 A
   Tungsten electrode: 2.4 mm in diameter
Shield gas: Ar, 25 liters/min
Filler wire: rating A5356, φ1.2 mm, feed rate 2 m/min
Welding rate: 4 m/min Second Embodiment FIG. 3*a* shows a composite YAG laser/arc welding apparatus according to a second embodiment. In the second embodiment, there is no filler wire feeding, and thus the wire guide 24 of the composite welding apparatus of the first embodiment is omitted. In this embodiment, because no power is dissipated in melting the filler wire, the arc current is reduced. As a consequence, a lap welding bead as shown in FIG. 3*b* is obtained. Again, the width of faying interface is large and the fusion is deep. A high rate welding operation with a stabilized quality is possible. Welding conditions used are given below.

Welded member 31: material A5052, 2 mm thick
Welded member 32: material A5052, 2 mm thick
YAG laser: output 4 KW, without assist gas (center gas)
Arc
   Current: 150 A
   Tungsten electrode: 2.4 mm in diameter
Shield gas: Ar 25 liters/min
Welding rate: 4 m/min As described above, since the plume generated by the laser irradiation starts an electric arc, there is no need to use a high frequency high voltage in order to start an arc. The arc welding added to the YAG laser welding provides an increased heat input to the surface layer of the welded member, permits a welding operation to be performed in a stable and reliable manner if there is a degree of butt welding gap, also permitting a high rate welding operation. Since the plume is kept within and around the key hole which is produced by the irradiation by the YAG laser, a welding operation is made possible which has a deep fusion and a large width of faying interface.

While a preferred embodiments of the present invention have been shown and described above, a number of changes and modifications therein are possible. Accordingly, it is not intended that the invention be limited to the specific construction or arrangement disclosed herein, but that the right is reserved to all changes and modifications coming within the scope of the invention defined by the appended claims.

What is claimed is:

1. A composite YAG laser/arc welding apparatus comprising
   a YAG laser welding head which emits a YAG laser beam which irradiates a member being welded;
   a hood having an opening therein which permits the YAG laser beam emitted from the head to pass therethrough and which is open toward the member being welded;
   an arc electrode secured to the hood and inclined to the center axis of the YAG laser beam to target, from outside of the YAG laser beam, a point on the member being welded which is irradiated by the YAG laser beam;
   a sleeve disposed between the YAG laser welding head and the hood and having an inner space in which the YAG laser beam passes through;
   a gas supply port for supplying a shield gas to the opening of the hood through the inner space of the sleeve;
   and a power supply connected between the member being welded and the arc electrode supplying electric power which is effective to start an arc, and to maintain the arc after it has once started from the arc electrode as a result of plasmoid gasses and metal vapors which are produced by the irradiation of the member being welded by the YAG laser.

2. A composite YAG laser/arc welding apparatus according to claim 1, further comprising a gas commutating body having a multitude of openings and partitioning the interior of the hood into a welding space located toward the member being welded and a gas supply space to which the opening of the hood opens, the arc electrode extending through the gas commutating body to target the point on the member being welded which is irradiated by the YAG laser beam.

3. A composite YAG laser/arc welding apparatus according to claim 1, further comprising a filler wire guide extending through the hood for guiding a filler wire to a molten pool located adjacent to the point irradiated by the YAG laser.

4. A composite YAG laser/arc welding apparatus according to claim 1, further comprising wheels disposed in a bottom portion of the hood to provide a clearance between the member being welded and the bottom of the hood.

* * * * *